April 21, 1931.  D. B. SALSTROM  1,801,982
FORM TOOL FOR CARVING MACHINES
Filed Nov. 25, 1929
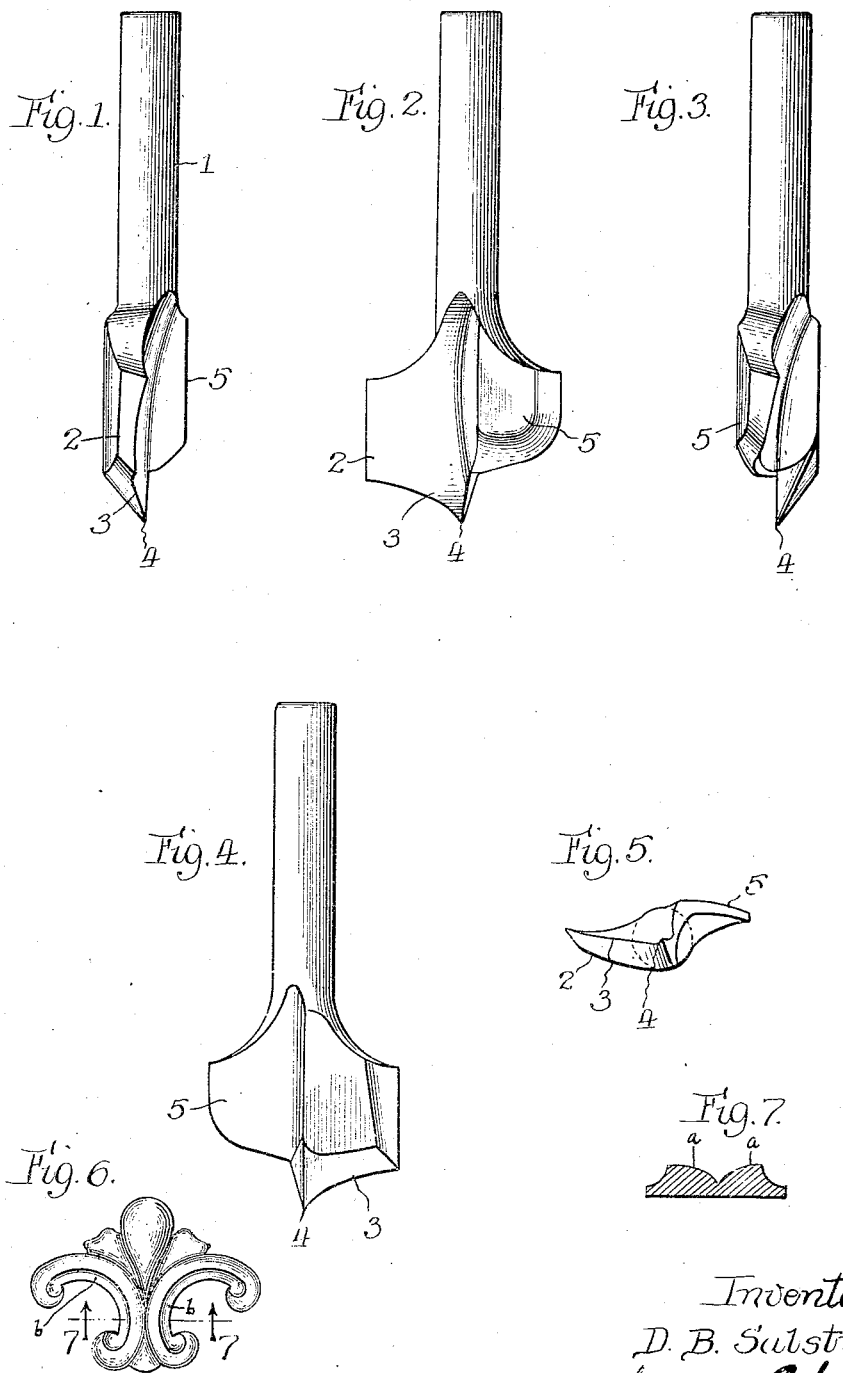
Inventor,
D. B. Salstrom,
By Churchill Parker Carlson
Attys.

Patented Apr. 21, 1931

1,801,982

UNITED STATES PATENT OFFICE

DAVID B. SALSTROM, OF CHICAGO, ILLINOIS, ASSIGNOR TO SALSTROM CARVING MACHINE COMPANY, OF CHICAGO, ILLINOIS, A CORPORATION OF ILLINOIS

FORM TOOL FOR CARVING MACHINES

Application filed November 25, 1929. Serial No. 409,542.

In the production of wood carvings by machine, as heretofore practiced, the cutter or "carving machine bit" has been simply a wood-removing cutter and has not of itself imparted the desired form to the workpiece. The bit reproduced the form of the pattern by reason of the fact that the tracer was moved back and forth over the surface of the pattern, the bit serving to remove wood from the work-piece little by little. While a skillful operator using a machine of proper construction can produce elaborate work of good quality by means of such bits, the cost of this method of making wood carvings has restricted its usefulness.

The present invention seeks to make possible the production of wood carvings of attractive design and excellent quality at a great saving in expense. This object has been attained by the production of a cutter of such shape as to produce the desired form and so constructed as to eliminate injurious vibration, it being well understood that vibration of the cutter renders impossible the production of smooth surfaces.

In the accompanying drawings:

Figures 1, 2, 3 and 4 are elevations of different sides of a form tool embodying the features of my invention, the views being enlarged for the sake of clearness.

Fig. 5 is a lower end view.

Fig. 6 illustrates a sample of work produced by means of the cutter.

Fig. 7 is a section on line 7—7 of Fig. 6.

The tool comprises a shank 1 adapted to be secured in the chuck of a carving machine spindle. At the lower end of the shank is a cutter blade 2 having a concave cutting edge 3 that may be said to start at the axial point 4 and extends upwardly and away from the axis of the tool. The edge 3 is so shaped as to produce (when the tool is rotated and moved transversely of its axis) a form which may be described as a groove having symmetrical convex side walls $a$ (Fig. 7).

Diametrically opposite the cutter blade 2 is a counterbalancing wing 5 which is located above the region swept by the cutting edge 3 and thus clears the work-piece. The wing 5 is of such weight and extends to such a distance from the axis of the tool as to counterbalance the cutter blade 2 and thus eliminates vibration.

Fig. 6 represents one of a great variety of carved ornaments that may be produced by means of the form tool herein shown. Except for the concave surfaces $b$, the carving of the ornament has been done solely with the tool herein described.

By reason of the fact that the point 4 is axially located, it is possible to produce thin lines, as will be understood from Figs. 6 and 7.

I claim as my invention:

A rotary form tool for carving machines having a securing shank, a point at the lower end of the tool, said point being in the axis of the shank, a cutter blade on the shank, said blade having a concave cutting edge that starts at said point and extends upwardly and away from said point, and a counterbalancing wing diametrically opposite said cutter blade and above the region swept by said cutting edge.

In testimony whereof, I have hereunto affixed my signature.

DAVID B. SALSTROM.